H. H. TUNIS.
COMPOSITE FOLLOWER WHEEL.
APPLICATION FILED SEPT. 19, 1908.
955,227.
Patented Apr. 19, 1910.
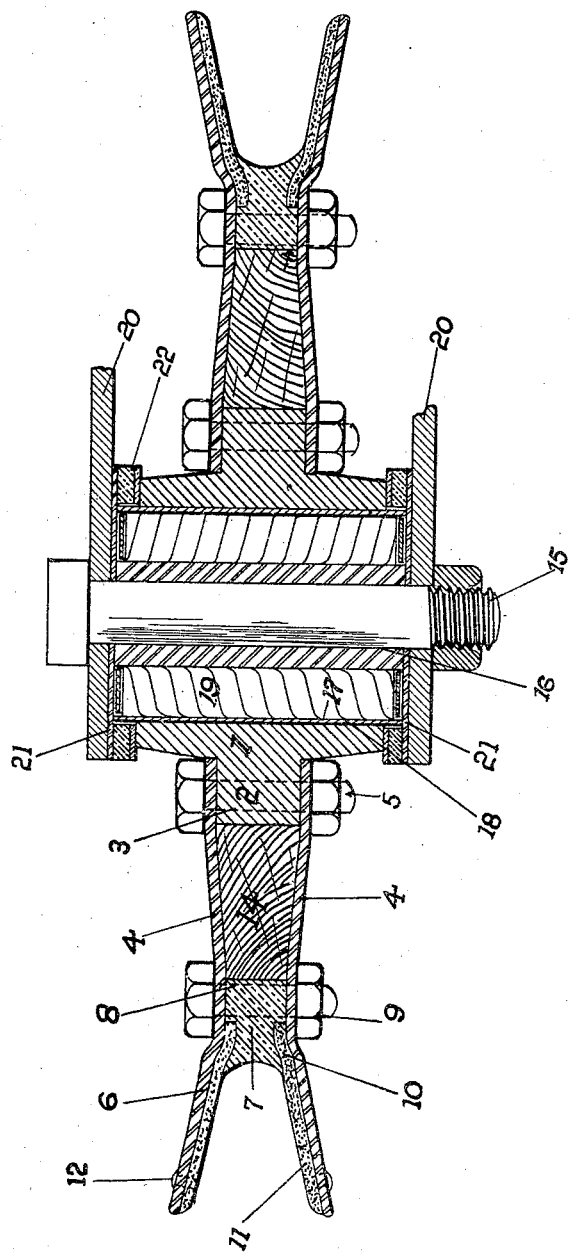
WITNESSES:
HOWARD H. TUNIS,
INVENTOR.
BY
ATTORNEYS.

UNITED STATES PATENT OFFICE.

HOWARD H. TUNIS, OF BALTIMORE COUNTY, MARYLAND, ASSIGNOR TO AMERICAN MONORAIL COMPANY, A CORPORATION OF SOUTH DAKOTA.

COMPOSITE FOLLOWER-WHEEL.

955,227.  Specification of Letters Patent.  Patented Apr. 19, 1910.

Application filed September 19, 1908. Serial No. 453,858.

*To all whom it may concern:*

Be it known that I, HOWARD H. TUNIS, citizen of the United States of America, residing in the county of Baltimore, State of Maryland, have invented certain new and useful Improvements in Composite Follower-Wheels, of which the following is a specification.

This invention relates to monorail roads and contemplates the provision of a new and improved follower wheel to engage the balance rail. Such wheels are in practice mounted on a car by suitable means and guided by the balance rail, whereby the car is maintained in upright position on the track.

The wheel consists of two disks secured to a hub. The hub is provided with a collar against which the disks rest and by which they are spaced. Just inside the outer periphery, a ring is placed between the disks, spacing them at this point. The disks are secured to each other adjacent the ring and adjacent the collar, and pressed against these members. The edges of the disks and the ring form the sides and bottom of a groove, the function of which is to receive the balance rail. The ring forming the bottom of the groove is preferably of bronze, and the sides of the groove are lined with leather. A packing of wood occupies the space between the disks intermediate the ring and the collar. Suitable anti-friction bearings are interposed between the wheel and the pin upon which it is mounted.

The invention is illustrated by a single figure which is an axial cross-section of the wheel.

The hub 1 is preferably of steel and substantially barrel-shaped. The central portion of its periphery is encircled by a collar or circular lug 2 pierced at intervals by bolt holes 3 parallel to the axis. Two similar but oppositely disposed disks 4, apertured centrally to receive the cylindrical portion of the hub are placed with the edges of their apertures resting on the opposite faces of the collar 2, and secured to each other and to the collar by means of bolts 5 passed through the holes 3. The disks are bent outward at the periphery at 6 and a bearing ring 7 of bronze is interposed between the disks just inside the bent portion. The bearing ring 7 is pierced by spaced holes 8 extending parallel to the axis, and bolts 9 passing through the holes 8 secure the disks and ring at this point. The thickness of the ring 7 is reduced near its periphery, leaving a narrow circumferential groove 10 between each disk and the face of the ring. A band of leather, fiber, or other similar material, 11, covers the inner face of each of the outwardly turned edge portions 6 of the disks. This leather is secured to the disks by means of rivets 12 and the inner edges of the leather bands extend into the groove 10 between the ring 7 and the disks. The space between the disks 4 and the intermediate ring 7 and the collar 2 of the hub is packed with wood in the form of a ring 14. The pin 15 upon which the wheel is mounted is inclosed by a steel bushing 16 and a second steel bushing 17 is driven into the cylindrical opening 18 of the hub, and anti-friction rollers 19 are interposed between the bushings 16 and 17. The hub is placed between members 20 of a bifurcated arm on the truck upon which it is mounted. Washers 21 encircle the pin 15 adjacent the arm, and soft bearing rings 22 are interposed between the washer and the extremities of the hub 1.

Having thus described my invention, what I claim and desire to secure by Letters Patent is:

1. In a follower wheel, a hub having a collar, two disks apertured centrally to admit the ends of the hub, the disks resting one on each side of the collar and secured thereto, a bearing ring placed between the disks, spaced from the periphery of the disks, and packing material between the disks filling the space between the collar and the bearing ring.

2. A follower wheel, consisting of a hub, two disks apertured centrally to admit the ends of the hub, and secured to the hub, a bearing ring placed between the disks, spaced from the periphery of the disks, and packing between the disks filling the space between the collar and the bearing ring.

3. In a follower wheel, a hub having a collar, two disks apertured centrally to admit the ends of the hub, the disks resting one on each side of the collar and secured thereto, a bearing ring between the disks and spaced from the periphery of the disks forming a peripheral groove between the edges of the disks, and yielding material lining the sides of the groove.

4. In a follower wheel, a hub having a collar, two disks apertured centrally to admit the ends of the hub, the disks resting one on each side of the collar and secured thereto, a bearing ring between the disks and spaced from the periphery of the disks forming a peripheral groove between the edges of the disks, yielding non-conducting material lining the sides of the groove.

Signed by me at Baltimore, Maryland, this 14th day of September 1908.

HOWARD H. TUNIS.

Witnesses:
 EDWARD L. BASH,
 L. H. LATHAM.